(12) United States Patent
Cai et al.

(10) Patent No.: US 10,405,360 B2
(45) Date of Patent: Sep. 3, 2019

(54) METHOD AND EQUIPMENT FOR ESTABLISHING MILLIMETRE CONNECTION

(71) Applicant: HUAWEI TECHNOLOGIES CO.,LTD., Shenzhen, Guangdong (CN)

(72) Inventors: Tao Cai, Kista (SE); Jussi Salmi, Kista (SE); Henrik Lundqvist, Kista (SE)

(73) Assignee: HUAWEI TECHNOLOGIES CO., LTD., Shenzhen (CN)

( * ) Notice: Subject to any disclaimer, the term of this patent is extended or adjusted under 35 U.S.C. 154(b) by 0 days.

(21) Appl. No.: 15/352,211

(22) Filed: Nov. 15, 2016

(65) Prior Publication Data

US 2017/0064748 A1 Mar. 2, 2017

Related U.S. Application Data

(63) Continuation of application No. PCT/EP2014/060006, filed on May 15, 2014.

(51) Int. Cl.
*H04B 7/06* (2006.01)
*H04B 7/08* (2006.01)
(Continued)

(52) U.S. Cl.
CPC .......... *H04W 76/10* (2018.02); *H04B 7/0617* (2013.01); *H04B 7/0619* (2013.01);
(Continued)

(58) Field of Classification Search
CPC .. H04B 7/0617; H04B 7/0417; H04B 7/0619; H04B 7/0695; H04B 7/088; H04B 17/318; H04W 16/28; H04W 76/02; H04W 76/10
See application file for complete search history.

(56) References Cited

U.S. PATENT DOCUMENTS 6,233,466 B1 5/2001 Wong et al.
8,290,443 B2 10/2012 Stirling-Gallacher et al.
(Continued)

FOREIGN PATENT DOCUMENTS

CN 101341771 A 1/2009
CN 102301255 A 12/2011
(Continued)

OTHER PUBLICATIONS

Dahman et al., "The Use of Frequency-Orthogonal Pseudonoise (FOPN) Sounding Signals for Identifying Transmissions From Different Transmit Antennas," in IEEE Antennas and Wireless Propagation Letters, vol. 8, pp. 657-660, 2009.*

(Continued)

*Primary Examiner* — Michelle M Koeth
(74) *Attorney, Agent, or Firm* — James Anderson Harrison (57) ABSTRACT

The present invention relates to a method and equipment for adaptively tracking a mobile terminal with millimeter wave radio link by establishing and/or maintaining a link between an access point or base station and a moving terminal where the method comprises changing the arrangement of the transmission directional beams of an access point or base station and the reception directional beams of a mobile terminal in a channel estimation process responsive to motion characteristics of the access point or base station transmitter or the mobile terminal receiver or both the access point or base station transmitter and the mobile terminal receiver. The invention further relates to a corresponding system and an access point or base station and a movable terminal provided with means for implementing the above method.

14 Claims, 7 Drawing Sheets

(51) Int. Cl.
*H04W 76/10* (2018.01)
*H04B 17/318* (2015.01)

(52) U.S. Cl.
CPC ......... *H04B 7/0695* (2013.01); *H04B 7/088* (2013.01); *H04B 17/318* (2015.01)

(56) References Cited

U.S. PATENT DOCUMENTS

| | | | |
|---|---|---|---|
| 8,565,193 | B2 | 10/2013 | Ylitalo |
| 9,084,260 | B2 * | 7/2015 | Maltsev ............ H04W 72/0453 |
| 2008/0220808 | A1 | 9/2008 | Jalali |
| 2010/0165914 | A1 | 7/2010 | Cho et al. |
| 2011/0028099 | A1 | 2/2011 | Cohen et al. |
| 2012/0249363 | A1 | 10/2012 | Kolinko et al. |
| 2013/0102345 | A1 | 4/2013 | Jung |
| 2013/0301454 | A1 | 11/2013 | Seol et al. |
| 2013/0315321 | A1 | 11/2013 | Rajagopal et al. |
| 2014/0056256 | A1 * | 2/2014 | Kim .................... H04W 72/046 370/329 |
| 2014/0098912 | A1 * | 4/2014 | Yin ..................... H04B 7/0417 375/345 |
| 2015/0230102 | A1 | 8/2015 | Kang et al. |

FOREIGN PATENT DOCUMENTS

| | | |
|---|---|---|
| CN | 103378892 A | 10/2013 |
| EP | 0992813 B1 | 8/2003 |
| EP | 2905358 A1 | 8/2015 |
| JP | 2010503365 A | 1/2010 |
| RU | 98661 U1 | 10/2010 |
| WO | 2013039335 A1 | 3/2013 |
| WO | 2013058612 A1 | 4/2013 |
| WO | 2013149189 A1 | 10/2013 |
| WO | 2014035216 A1 | 3/2014 |
| WO | 2015090353 A1 | 6/2015 |

OTHER PUBLICATIONS

J. Wang et al., "Beam codebook based beamforming protocol for multi-Gbps millimeter-wave WPAN systems," in IEEE Journal on Selected Areas in Communications, vol. 27, No. 8, pp. 1390-1399, Oct. 2009.*

Dahman et al., "The Use of Frequency-Orthogonal Pseudonoise (FOPN) Sounding Signals for Identifying Transmissions From Different Transmit Antennas," in IEEE Antennas and Wireless Propagation Letters, vol. 8, pp. 657-660, 2009. (Year: 2009).*

J. Wang et al., "Beam codebook based beamforming protocol for multi-Gbps millimeter-wave WPAN systems," in IEEE Journal on Selected Areas in Communications, vol. 27, No. 8, pp. 1390-1399, Oct. 2009. (Year: 2009).*

Hampson et al., "Efficient Multi-Beaming for the Next Generation of Radio Telescopes," Perspectives on Radio Astronomy—Technologies for Large Antenna Arrays, Netherlands Foundation for Research in Astronomy, pp. 265-276, 1999 (Year: 1999).*

Junyi Wang et al. Beam Codebook Based Beamforming Protocol forMulti-Gbps Millimeter-Wave WPAN Systems. IEEE Journal on Selected Areas in Communications, vol. 27, No. 8, Oct. 2009. pp. 190-1399.

* cited by examiner

METHOD AND EQUIPMENT FOR ESTABLISHING MILLIMETRE CONNECTION

CROSS-REFERENCE TO RELATED APPLICATIONS

This application is a continuation of International Application No. PCT/EP2014/060006, filed on May 15, 2014, the disclosure of which is hereby incorporated by reference in its entirety.

TECHNICAL FIELD

The present invention relates to the field of wireless networks and methods and equipments for use in such networks, and particularly to establish millimeter connection, in order to track a mobile terminal with a millimeter wave radio link.

BACKGROUND

A millimeter wave is an electromagnetic wave (radio wave) with a wavelength between 1 mm and 10 mm. The frequency of a millimeter wave is from 30 GHz to 300 GHz. Sometimes a radio wave with a frequency from 3 GHz and above is alternatively called millimeter wave radio.

Traditionally millimeter waves have been used for the backhaul connection for a mobile network. As the low frequency region becomes crowed with all kinds of radio access services, the millimeter wave becomes increasingly interesting to the research community and the wireless industry for the purpose of establishing the access connection between the access point and the mobile terminal.

There are two special aspects of millimeter wave radio from the perspective of its antenna design. One is that the millimeter wave radio will capture a smaller amount of energy, due to the higher frequency of the waves. Further, millimeter wave radio will have larger noise power, due to the channel bandwidth of millimeter wave radio being normally wider. Millimeter wave radio will suffer from lower signal-to-noise ratio because of the above properties, however, this can be compensated for by higher antenna gains with higher antenna directionality. Because of the smaller wavelength of millimeter waves, the antenna size is smaller for millimeter wave radio. The transmitter and receiver of a millimeter radio can accommodate more antenna elements and narrower beams can hence be produced with a large number of antenna elements resulting in a higher antenna gain. The beam can be formed through a phase control system such that the direction, as well as the beam width can be adjusted.

A narrower beam is beneficial for the purpose of providing higher antenna gains, causing less multi-path fading as well as minimizing cross link interference. To establish and maintain a link between the transmitter and the receiver via narrow beams, it is important to consider the directionality management of the narrow beams for the design, operation and optimization of millimeter wave radio system.

It is known within the art to receive from a user an uplink signal using multiple narrow antenna beams and measuring beam-specific pilot signal power from the uplink signal for all of the beams. The measured pilot signal powers are used to determine which one or ones of the downlink beams is to be used for a downlink signal for the user. This known method suffers from the problem that no solution on how to predicatively compensate for the changes caused by the motion of the mobile terminal is provided.

In millimeter wave based radio systems, the mobile terminal can be moving around with different mobility pattern. There are a number of problems resulting from this movement of the terminal, such as, but not necessarily limited to how the terminal's movement can be tracked and be utilized in the establishment of a high gain millimeter wave link and how the millimeter wave access link can be maintained. Furthermore it is a problem how to decide the next best beam direction from the current best beam direction. Still further, it is a problem how the tracking strategy can be made adaptive when the terminal is in a different environment or with a different movement pattern, such as for example when the terminal is carried by a pedestrian, a high speed vehicle or even if the terminal is a fixed node that is swaying due to a strong wind.

SUMMARY

In view of the above background it is an object of the present invention to provide a method and equipment by means of which it is possible to establish and maintain a high gain millimeter wave link between an access point/base station and a moving terminal.

It is a further object of the present invention to provide a method and equipment that makes it possible to determine the next best high gain millimeter wave link between an access point and a moving terminal compared to the current best link.

It is a further object of the present invention to provide a method and equipment that can establish and maintain the best possible link between an access point and a moving terminal, when the transmission characteristics changes over time, as for instance when the terminal is carried by a pedestrian, a high speed vehicle or even if the terminal is a fixed node that is swaying due to for instance a strong wind.

The above and further objects and advantages are according to the present invention obtained by changing the arrangement of the transmission directional beams of an access point and the reception directional beams of a mobile terminal in a channel estimation process responsive to the motion characteristics of the access point transmitter or the mobile terminal receiver or both the access point transmitter and the mobile terminal receiver, in order to increase the channel estimation success rate, and/or shorten the channel estimation period, and/or to save resources used in the channel estimation process. The method and equipment of the present invention results in improved flexibility/adaptability of the channel estimation process. According to the invention, in order to establish and maintain the best pair of transmitter antenna pattern and receiver antenna pattern, the training/tracking operation is adaptively modified. According to the channel estimation process of the invention the transmitter emits multiple beams, which can be distributed around the strongest transmission directional beam currently being used, and the receiver uses different directional antenna patterns to test the transmitter antenna pattern and then provides a feedback to the transmitter. Based on the feedback, the consecutive best beam direction in the following communication can be determined. In the following, the transmitter antenna pattern and the receiver antenna pattern can be used interchangeably with the transmission directional beam and the reception directional beam. The transmission directional beams and reception directional beams can be used for channel estimation purpose and for pay-load data transmission purpose. The strongest beams are normally regarded as the best beams and will be used for the pay-load transmission after the channel estimation process.

According to a first aspect of the invention there is provided a method for establishing connection, the method comprising the steps of:

at a receiver receiving a first number of directional beams transmitted by a transmitter in different directions relative to said receiver via different sub-bands;

determining a first directional beam having the strongest signal;

establishing a first connection between said receiver and transmitter using the first directional beam direction;

at said receiver receiving a second number of directional beams transmitted by said transmitter in different directions relative to said receiver via different sub-bands, wherein the different directions of the second number of directional beams are in the vicinity of the direction of the first directional beam;

determining a second directional beam having the strongest signal; and establishing a second connection between said receiver and transmitter using the second directional beam.

According to the first aspect of the present invention there is advantageously established a connection with stronger signal intensity, in order to track the motion of the receiver or the transmitter. When either the receiver or the transmitter is a mobile terminal, a simple and reliable method results that allows adaptively tracking a mobile terminal with a radio link by establishing and/or maintaining a link between one terminal that may be movable or stationary, such as an access point or a base station and another terminal that may likewise be movable or stationary In a first possible implementation form of the method according to the first aspect, the above mentioned radio link is a millimeter wave radio link.

In a second possible implementation form of the method according to the first aspect as such or the first implementation form, the receiver is a mobile terminal receiver.

In a third possible implementation form of the method according to the first aspect as such or according to any of the preceding implementation forms of the first aspect, a plurality of transmission directional beams and/or a plurality of reception directional beams are used for initial establishment of said link.

In a fourth possible implementation form of the method according to the first aspect as such or according to any of the preceding implementation forms of the first aspect, a plurality of transmission directional beams that are located in the vicinity of the strongest transmission directional beam of the first set of the transmission directional beams are used.

In a fifth possible implementation form of the method according to the first aspect as such or to any of the preceding implementation forms of the first aspect, the mobile terminal receiver uses different reception directional beams to test the transmission directional beams. This can for instance be different narrow beams pointing to different directions. The direction and the width of the beams can be adapted jointly or separately. An omni direction beam is one special example as the antenna pattern is a single circle.

In a sixth possible implementation form of the method according to the first aspect as such or according to any of the preceding implementation forms of the first aspect, the mobile terminal receiver uses broader reception directional beams to test the transmission directional beams.

In a seventh possible implementation form of the method according to the first aspect as such or to any of the preceding implementation forms of the first aspect, the mobile terminal receiver uses an omni-directional reception directional beam to test the transmission directional beams.

In an eighth possible implementation form of the method according to the first aspect as such or to any of the preceding implementation forms of the first aspect, wider beams are initially used by the transmitter and/or the receiver to provide initial coarse channel estimation.

In a ninth possible implementation form of the method according to the first aspect as such or to any of the preceding implementation forms of the first aspect, the initial coarse channel estimation is followed by channel estimation based on either narrower transmission directional beams or narrower reception directional beams or based on both narrower transmission directional beams and reception directional beams, thereby obtaining more accurate channel estimation results.

In a tenth possible implementation form of the method according to the first aspect as such or to any of the preceding implementation forms of the first aspect, a low frequency spectral band is used by the transmission directional beam and the receiver simultaneously, instead of a high frequency spectral band, to obtain coarse channel estimation results as normally low frequency spectral band will produce wider beams.

In an eleventh possible implementation form of the method according to the first aspect as such or to any of the preceding implementation forms of the first aspect, the number of transmission directional beams and the number of reception directional beams are changed adaptively.

In a twelfth possible implementation form of the method according to the first aspect as such or to any of the preceding implementation forms of the first aspect, the deviations of the channel estimation transmission directional beams from the currently best transmission directional beam is adapted according to motion characteristics of the transmitter or the receiver or both the transmitter and the receiver.

In a thirteenth possible implementation form of the method according to the first aspect as such or to any of the preceding implementation forms of the first aspect, the deviations of the channel estimation reception directional beams from the currently best reception directional beam is adapted according to motion characteristics of the transmitter or the receiver or both the transmitter and the receiver.

In a fourteenth possible implementation form of the method according to the first aspect as such or to any of the preceding implementation forms of the first aspect, the motion characteristics are obtained from a vehicle information repository, for instance comprising information relating to the route of the vehicle, the timetable of the vehicle and the velocity and/or location of the vehicle.

In a fifteenth possible implementation form of the method according to the first aspect as such or to any of the preceding implementation forms of the first aspect, the motion characteristics are derived from sensor measurements.

In a sixteenth possible implementation form of the method according to the first aspect as such or to any of the preceding implementation forms of the first aspect, the motion characteristics are used to determine or change the duration of the channel estimation process before actual pay-load data are transmitted or received.

In a seventeenth possible implementation form of the method according to the first aspect as such or to any of the preceding implementation forms of the first aspect, implementation of the method according to the invention the motion characteristics are used to trigger start/stop of the channel estimation process.

In an eighteenth possible implementation form of the method according to the first aspect as such or to any of the preceding implementation forms of the first aspect, implementation of the method according to the invention an initial channel estimation step a first number of beams are used to cover the vicinity of current best beam and, if the first channel estimation step fails, a second number of beams are used to cover the vicinity of current best beam where said second number of beams is larger than said first number of beams such that the number of beams used for the channel estimation purpose is adapted according to the outcome of the channel estimation.

In a nineteenth possible implementation form of the method according to the first aspect as such or to any of the preceding implementation forms of the first aspect, implementation of the method according to the invention the number of channel estimation beams is reduced when channel estimation has succeeded such that the number of beams used for the channel estimation purpose is adapted according to the outcome of the channel estimation.

In a twentieth possible implementation form of the method according to the first aspect as such or to any of the preceding implementation forms of the first aspect, implementation of the method according to the invention changes to wider beams and/or lower frequency signals when the channel estimation process has failed after a predefined channel estimation time period.

In a twenty-first possible implementation form of the method according to the first aspect as such or to any of the preceding implementation forms of the first aspect, implementation of the method according to the invention the transmitter channel estimation beams and the receiver channel estimation beams are arranged in a sequential manner.

In a twenty-second possible implementation form of the method according to the first aspect as such or to any of the preceding implementation forms of the first aspect, implementation of the method according to the invention the arrangement of the channel estimation sequence is communicated between the transmitter and the receiver.

In a twenty-third possible implementation form of the method according to the first aspect as such or to any of the preceding implementation forms of the first aspect, implementation of the method according to the invention multiple channel estimation beams are transmitted simultaneously, whereby duration of the channel estimation process is reduced.

In a twenty-fourth possible implementation form of the method according to the first aspect as such or to any of the preceding implementation forms of the first aspect, implementation of the method according to the invention the different transmission directional beams use different sub-bands of the used spectral band. Normally a spectral band comprises multiple sub-bands.

In a twenty-fifth possible implementation form of the method according to the first aspect as such or to any of the preceding implementation forms of the first aspect, implementation of the method according to the invention the pay-load transmission is used for channel estimation purpose.

In a twenty-sixth possible implementation form of the method according to the first aspect as such or to any of the preceding implementation forms of the first aspect, implementation of the method according to the invention the pay-load transmission is adaptive.

According to a second aspect of the present invention a system for establishing a connection between said receiver and a transmitter is provided. The system comprises a receiver configured for:
- using a first set of reception directional beams testing signal intensities of a first set of transmission directional beams in different directions, which are transmitted via different sub-bands by the transmitter;
- transmitting a result of the signal intensities test of the first set of transmission directional beams to the transmitter;
- receiving an indication of a first pair of directional beams having the strongest signal intensity, wherein the first pair of directional beams comprises a reception directional beam of the first set of reception directional beams and a transmission directional beam of the first set of the transmission directional beams;
- establishing a first connection between the receiver and the transmitter using the first pair of directional beams;
- using a second set of reception directional beams testing signal intensities of a second set of transmission directional beams in different directions, which are transmitted via different sub-bands by said transmitter, wherein the different directions of the second set of transmission directional beams are in the vicinity of the direction of the transmission directional beam of the first pair of directional beams;
- transmitting a result of the signal intensities test of the second set of transmission directional beams to the transmitter;
- receiving an indication of a second pair of directional beams having the strongest signal intensity, wherein the signal intensity of the second pair of directional beams is stronger than the signal intensity of the first pair of directional beams; wherein the second pair of directional beams comprises a reception directional beam of the second set of reception directional beams and a transmission directional beam of the second set of transmission directional beams; and
- establishing a second connection between the receiver and the transmitter using the second pair of directional beams.

According to the second aspect of the present invention there is advantageously established a connection with stronger signal intensity, in order to track the motion of the receiver or the transmitter. When either the receiver or the transmitter is a mobile terminal, a simple and reliable system that allows adaptively tracking a mobile terminal with a radio link by establishing and/or maintaining a link between one terminal that may be movable or stationary, such as an access point or a base station and another terminal that may likewise be movable or stationary.

In a first possible implementation form of the system according to the second aspect, the above mentioned radio link is a millimeter wave radio link.

In a second possible implementation form of the system according to the second aspect as such or to the first implementation form of the second aspect, the receiver is a mobile terminal receiver.

In a third possible implementation form of the system according to the second aspect as such or to any preceding implementation forms of the second aspect, the respective transmitter and receiver comprise antennas configured to emit and receive, respectively, the radio wave in a plurality of beams.

In a fourth possible implementation form of the system according to the second aspect as such or to any preceding implementation forms of the second aspect, the system carries out beam-forming algorithms based on signals provided to the transmitter and/or the receiver.

In a fifth possible implementation form of the system according to the second aspect as such or to any preceding implementation forms of the second aspect, the mobile terminal receiver is provided with antenna means for creating an omni-directional reception directional beam to test the transmission directional beams.

In a sixth possible implementation form of the system according to the second aspect as such or to any preceding implementation forms of the second aspect, the system comprises motion characteristics determining means configured for determining the motion characteristics of the transmitter in the access point or base station, or the motion characteristics of the receiver in the mobile terminal or the motion characteristics of both the transmitter and the receiver.

In a seventh possible implementation form of the system according to the second aspect as such or to any preceding implementation forms of the second aspect, the motion characteristics are obtained from a vehicle information repository, for instance comprising information relating to the route of the vehicle, the timetable of the vehicle and the velocity and/or location of the vehicle.

In an eighth possible implementation form of the system according to the second aspect as such or to any preceding implementation forms of the second aspect, the motion characteristics are derived from sensor measurements provided by sensors attached to the access point or base station or to the mobile terminal or to both the access point or base station and the mobile terminal.

In a ninth possible implementation form of the system according to the second aspect as such or to any preceding implementation forms of the second aspect, the transmitter and receiver, respectively, comprises beam arranging means configured to arrange the transmitter channel estimation beams and the receiver channel estimation beams, respectively, in a sequential manner.

In a tenth possible implementation form of the system according to the second aspect as such or to any preceding implementation forms of the second aspect, the transmitter and the receiver, respectively, are provided with communication means that communicate the arrangement of the channel estimation sequence between the transmitter and the receiver.

According to a third aspect of the invention there is provided an access point or base station provided with a transmitter for establishing and/or maintaining a radio link between said access point or base station and a moving terminal, wherein the transmitter is provided with an antenna configured for changing the arrangement of the transmission directional beams of the access point or base station in a channel estimation process responsive to the motion characteristics of the access point or base station or the mobile terminal or both the access point or base station and the mobile terminal.

In a first possible implementation form of the access point or base station according to the third aspect, the radio link is a millimeter wave radio link.

In a second possible implementation form of the access point or base station according to the third aspect as such or to any of the preceding implementation forms of the third aspect, the transmitter comprises an antenna configured to emit said radio wave in a plurality of beams.

In a third possible implementation form of the access point or base station according to the third aspect as such or to any of the preceding implementation forms of the third aspect, the transmitter carries out beam-forming algorithms on signals provided to the transmitter.

In a fourth possible implementation form of the access point or base station according to the third aspect as such or to any of the preceding implementation forms of the third aspect, the access point or base station comprises motion characteristics determining means configured for determining the motion characteristics of the transmitter in the access point or base station.

In a fifth possible implementation form of the access point or base station according to the third aspect as such or to any of the preceding implementation forms of the third aspect, the motion characteristics are derived from sensor measurements provided by sensors attached to the access point or base station.

In a seventh possible implementation form of the access point or base station according to the third aspect as such or to any of the preceding implementation forms of the third aspect, the transmitter comprises beam arranging means configured to arrange the transmitter channel estimation beams in a sequential manner.

In an eighth possible implementation form of the access point or base station according to the third aspect as such or to any of the preceding implementation forms of the third aspect, the transmitter is provided with communication means that communicate the arrangement of the channel estimation sequence between the transmitter and a receiver in a mobile terminal.

According to a fourth aspect of the invention there is provided a mobile terminal provided with a receiver for establishing and/or maintaining a radio link between the mobile terminal and an access point or base station, wherein the receiver is provided with an antenna configured for changing the arrangement of the reception directional beams in a channel estimation process responsive to the motion characteristics of the mobile terminal or the access point or base station or both the access point or base station and the mobile terminal.

In a first possible implementation form of the mobile terminal according to the fourth aspect, the radio link is a millimeter wave radio link.

In a second possible implementation form of the mobile terminal according to the fourth implementation as such or to any of the preceding implementation forms of the fourth aspect, the receiver comprises an antenna configured to receive said radio wave in a plurality of beams.

In a third possible implementation form of the mobile terminal according to the fourth implementation as such or to any of the preceding implementation forms of the fourth aspect, the mobile terminal carries out beam-forming algorithms in order to form different patterns or diagrams of the receiver antennas.

In a fourth possible implementation form of the mobile terminal according to the fourth implementation as such or to any of the preceding implementation forms of the fourth aspect, the mobile terminal receiver is provided with antenna means for creating an omni-directional reception directional beam or antenna pattern or antenna diagram to test the transmission directional beams.

In a fifth possible implementation form of the mobile terminal according to the fourth implementation as such or to any of the preceding implementation forms of the fourth aspect, the mobile terminal comprises motion characteristics determining means configured for determining the motion characteristics of the mobile terminal.

In a sixth possible implementation form of the mobile terminal according to the fourth implementation as such or to any of the preceding implementation forms of the fourth aspect, the motion characteristics are obtained from a vehicle information repository, for instance comprising information relating to the route of the vehicle, the timetable of the vehicle and the velocity and/or location of the vehicle.

In a seventh possible implementation form of the mobile terminal according to the fourth implementation as such or to any of the preceding implementation forms of the fourth aspect, the motion characteristics are derived from sensor measurements provided by sensors attached to the mobile terminal.

In an eighth possible implementation form of the mobile terminal according to the fourth implementation as such or to any of the preceding implementation forms of the fourth aspect, the receiver comprises beam arranging means configured to arrange the receiver channel estimation beams in a sequential manner.

In a ninth possible implementation form of the mobile terminal according to the fourth implementation as such or to any of the preceding implementation forms of the fourth aspect, the receiver is provided with communication means that communicate the arrangement of the channel estimation sequence between the receiver and an access point or base station.

Further objects, features, advantages and properties of the method, system, access point or base station and mobile terminal according to the invention will become apparent from the following detailed description.

BRIEF DESCRIPTION OF THE DRAWINGS

In the following detailed portion of the present invention, the invention will be explained in more detail with reference to the example embodiments shown in the drawings, in which.

DETAILED DESCRIPTION

The following detailed description relates to a specific, but non-limiting, example embodiment of the invention.

Figure 1:
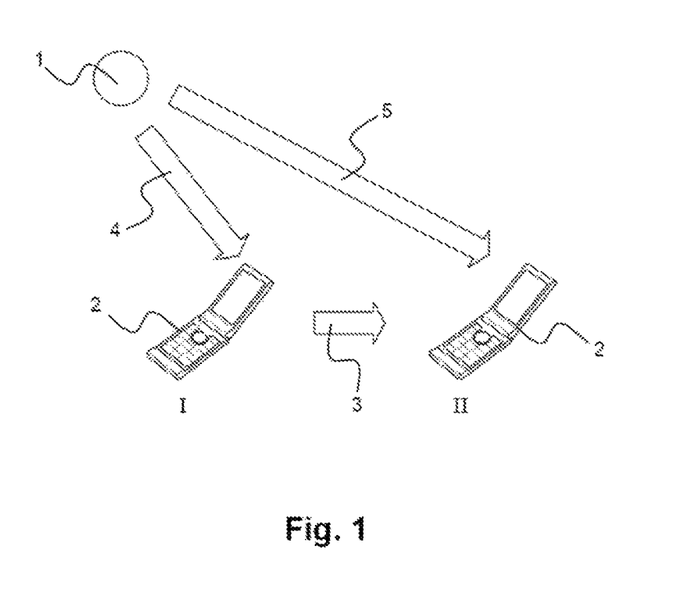
FIG. 1 shows a schematic representation that illustrates that an access point needs to change beam direction in order to maintain the connection link with the mobile terminal according to an embodiment of the invention.

Referring to FIG. 1 there is shown a schematic representation that illustrates the advantage of an access point 1 changing beam direction (from 4 to 5) in order to maintain the connection link with a mobile terminal 2 that moves along a path 3 from a first position I to a second position II.

Figure 2:
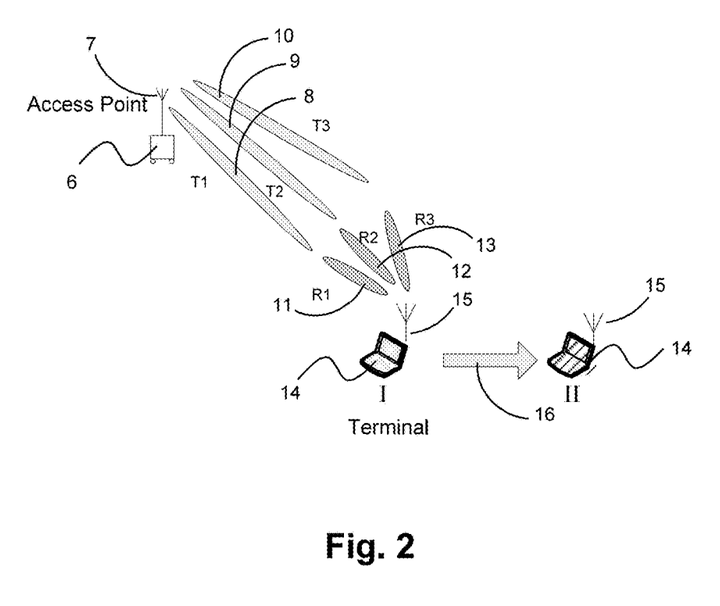
FIG. 2 shows a schematic representation that illustrates the basic operation concept according to an embodiment of the invention.

Referring to FIG. 2 there is shown a schematic representation that illustrates the basic operation concept according to the invention.

According to the invention, in order to establish and maintain the best pair of transmitter antenna pattern and receiver antenna pattern, the training/tracking operation is adaptively modified. According to the channel estimation process of the invention the transmitter emits a pattern of multiple beams, which can be distributed around the strongest transmission directional beam currently being used, and the receiver uses different directional antenna patterns to test the transmitter antenna pattern and then provided a feedback to the transmitter. Based on the feedback the consecutive best beam direction in the following communication can be determined. In the following, the transmitter antenna pattern and the receiver antenna pattern can be used interchangeably with the transmission directional beam and the reception directional beam.

According to the invention during the initial establishment of the millimeter wave link, the number of channel estimation beams can be higher to cover a larger possible area. The receiver may use different receiving antenna patterns to test the possible transmission direction in order to find a best pair of transmitter antenna beam direction and receiver antenna beam direction after which the radio connection can be established.

After the radio connection is established, a number of channel estimation transmission directional beams can be transmitted in the vicinity of the currently best (or the currently used) transmission directional beam. The receiver can evaluate the different channel estimation transmission directional beams and provide feedback to the transmitter. For example channel estimation transmission directional beams can be created around the currently used transmission directional beam. At the next update the best transmission directional beam direction is determined based on the evaluated channel estimation results.

The receiver can use different reception directional beams to test the transmission directional beams. Alternatively the receiver can use wider beams or an omni-directional antenna pattern.

Wider beams can be used by the transmitter and the receiver to obtain coarse estimation results, which can be followed by channel estimation operation with narrower beams to obtain finer/more accurate estimation results.

Low frequency spectral bands can be used by the transmitter and the receiver simultaneously, instead of high frequency spectral bands, to obtain coarse estimation results, as low frequency spectral band will provide wider beams for transmitter and receiver.

The number of transmitter channel estimation beams and their deviation from the current best transmission directional beam (i.e. angular difference), as well as the number of the receiver channel estimation beams and their deviation from the current best reception directional beam, can be adapted according to motion characteristics of the terminal. The motion characteristics (velocity, route etc.) can be obtained from a vehicle information depository or database where the route of the vehicle, timetable of the vehicle, velocity and/or location information are registered in such vehicle information database. The association between the terminal and the vehicle can be determined by Near-Field-Communication communication methods or other means. The motion characteristics can be derived from the measurement of sensors which are embedded in the terminal, for example gyroscope, accelerometer, GPS sensor; or from the measurement of sensors such as a speedometer of the associated vehicle, wind speed meter or other types of sensors. For higher speeds/high motion terminal, the number of channel estimation beams can be larger; the deviation of channel estimation beams from the current best beam can be larger. On the contrary, for low speed/angular speed terminal, for instance four beams around the current best beam could be used and for high speed/angular speed terminal for instance 16 channel estimation beams around the current best beam could be used. Level of speed/angular speed can also be used to tune the duration of the channel estimation operation before the actual pay-load data is transmitted.

Sensor measurements can be used to trigger start/stop of the channel estimation procedure. When the terminal is a fixed node, e.g. a wireless backhaul node, the number of channel estimation beams and the deviation, start/stop of the channel estimation process can be dependent on the measurement of wind speed meter and/or gyroscope sensor. For example for fixed point-to-point backhaul link, it is normally not needed to estimate the channel very frequently. In the case of strong wind, the shaking backhaul supporting structure (e.g. a lamp post) and/or the surrounding foliage can have an impact on the best beam direction between a transmitter and a receiver, and a sensor, such as a gyroscope or wind speedometer can trigger the channel estimation procedure.

In an embodiment of the invention a multi-step, heuristic channel estimation process can be used: initially, a small number of beams are used to estimate the vicinity of the currently used beam. If the first channel estimation step failed, a larger number of beams are used to estimate the larger vicinity. Accordingly the number of channel estimation beams can be reduced when channel estimation success is obtained. The multi-step, heuristic channel estimation process can be effective to use for the case when there is no a priori knowledge about the channel and/or the terminal.

Changing to a wider beam or beams and/or to a lower frequency signal can be the "fall-back" scheme when the channel estimation process failed after the termination of the predefined channel estimation time period.

According to an embodiment of the invention, instead of using a predefined channel estimation period, the payload transmission can be used for the channel estimation purpose. The transmission of the payload can take place using multiple beams around the previous "best beam". The number of redundant transmission beams and their directions shall be adaptively tuned in the similar manner as for the channel estimation beams.

Multiple channel estimation beams can be transmitted simultaneously to shorten the channel estimation process or be transmitted sequentially to save energy.

Figure 3:
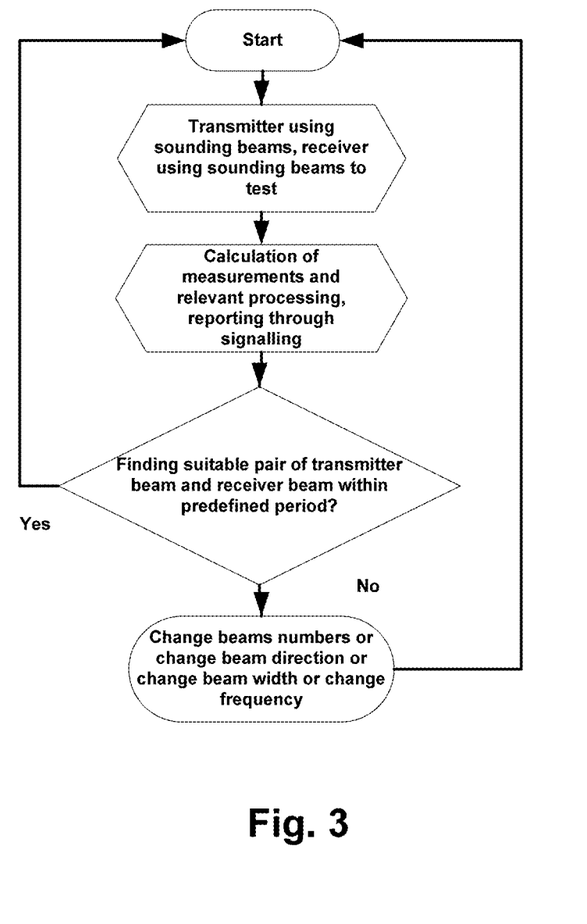
FIG. 3 shows a flow chart that illustrates channel estimation beam control according to an embodiment of the invention.

FIG. 3 shows a flow chart that illustrates channel estimation beam control according to an embodiment of the invention.

In an embodiment of the invention the transmitter channel estimation beams can be arranged in sequential manner, and the receiver channel estimation beams are arranged in sequential manner. The arrangement of channel estimation sequence can be communicated between the transmitter and the receiver beforehand.

In an alternative embodiment of the invention the multiple transmission directional beams can be transmitted simultaneously by the transmitter. The different transmission directional beams can use different sub-bands of the used spectral band to differentiate the multiple transmission directional beams. The receiver, which covers all the used sub-bands of the used spectral band, uses channel estimation beams in sequential manner. The purpose of such arrangement is to shorten the channel estimation period.

Instead of using a predetermined channel estimation period, the payload transmission can be used also for the channel estimation purpose.

Figure 4A:
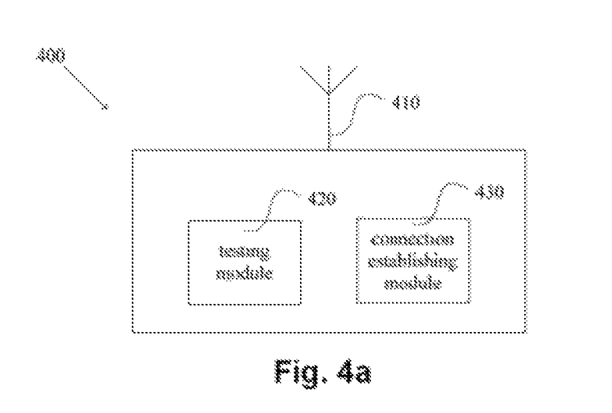
FIG. 4a illustrates a schematic structure of a receiver according to an embodiment of the invention.

FIG. 4a illustrates a schematic structure of a receiver as shown in FIG. 2. The receiver 400 comprises:

a testing module 420 configured for using a first set of reception directional beams 11, 12, 13 testing signal intensities of a first set of transmission directional beams 8, 9, 10 in different directions, which are transmitted via different sub-bands by the transmitter 500;

an antenna 410 configured for transmitting a result of the signal intensities test of the first set of transmission directional beams 8, 9, 10 to the transmitter 500; wherein the antenna 410 is further configured for receiving an indication of a first pair of directional beams having the strongest signal intensity, wherein the first pair of directional beams comprises a reception directional beam of the first set of reception directional beams 11, 12, 13 and a transmission directional beam of the first set of the transmission directional beams 8, 9, 10; and a connection establishing module 430 configured for establishing a first connection between the receiver 400 and the transmitter 500 using the first pair of directional beams;

wherein the testing module is further configured for using a second set of reception directional beams testing signal intensities of a second set of transmission directional beams in different directions, which are transmitted via different sub-bands by said transmitter 500, wherein the different directions of the second set of transmission directional beams are in the vicinity of the direction of the transmission directional beam of the first pair of directional beams;

wherein the antenna 410 is further configured for transmitting a result of the signal intensities test of the second set of transmission directional beams 8, 9, 10 to the transmitter 500;

wherein the antenna 410 is further configured for receiving an indication of a second pair of directional beams having the strongest signal intensity, wherein the signal intensity of the second pair of directional beams is stronger than the signal intensity of the first pair of directional beams; wherein the second pair of directional beams comprises a reception directional beam of the second set of reception directional beams and a transmission directional beam of the second set of transmission directional beams; and wherein the connection establishing module is further configured for establishing a second connection between the receiver 400 and the transmitter 500 using the second pair of directional beams.

In a possible implementation form of the receiver 400, the first set of transmission directional beams 8, 9, 10 are in wider beamwidth than the second set of transmission directional beams; and/or the first of reception directional beams 11, 12, 13 are in wider beamwidth than the second set of reception directional beams.

In another possible implementation form of the receiver 400 according, the frequency of the first set of transmission directional beams 8, 9, 10 is lower than the frequency of the second set of transmission directional beams; and/or the frequency of the first set of reception directional beams 11, 12, 13 is lower than the frequency of the second set of reception directional beams.

In another possible implementation form of the receiver 400, the receiver 400 is a mobile terminal. The number of the transmission directional beam in second set transmission directional beams is associated to motion characteristics of the mobile terminal; and/or the number of the reception direction beam of the second set of reception directional beams is associated to motion characteristics of the mobile terminal.

The motion characteristics can be derived from the measurement of sensors which are embedded in the mobile terminal, for example gyroscope, accelerometer, GPS sensor; or from the measurement of sensors such as a speedometer of the associated vehicle, wind speed meter or other types of sensors.

In another possible implementation form of the receiver 400, the motion characteristics comprises a motion speed, when the mobile terminal moves in higher speed, the number of the transmission directional beam in the second set of transmission directional beams is more than the number of the transmission directional beam in the first set of transmission directional beams 8, 9, 10; and/or the number of the reception directional beam in the second set of reception directional beams is more than the number of the reception directional beam in the first set of reception directional beams 11, 12, 13.

In another possible implementation form of the receiver 400, the first set of reception directional beams 11, 12, 13 are in wider beamwidth than the first set of transmission directional beams 8, 9, 10; and/or the second set of reception directional beams are in wider beamwidth than the second set of transmission directional beams.

In another possible implementation form of the receiver 400, the first/second set of reception directional beams are omni-directional beams.

Figure 4B:
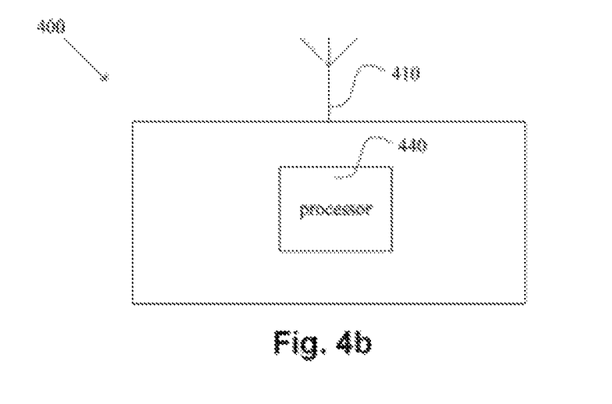
FIG. 4b illustrates a schematic structure of a receiver according to another embodiment of the invention.

FIG. 4b illustrates another schematic structure of a receiver as shown in FIG. 2. The receiver 400 alternatively comprises: an antenna 420 as shown in FIG. 4a, and a processor 440 implementing the testing module 420 and the connection establishing module 430 shown in FIG. 4a.

Figure 5A:
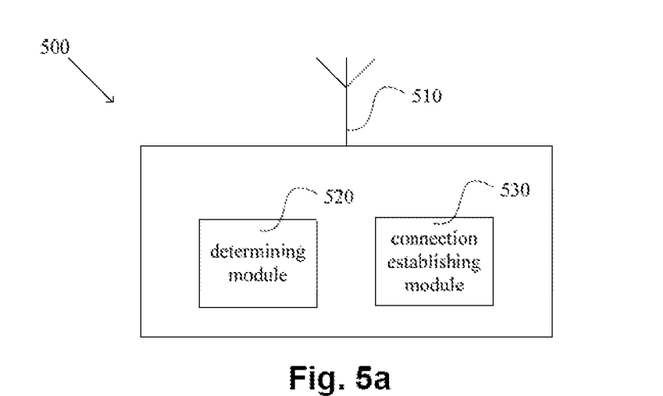
FIG. 5a illustrates a schematic structure of a transmitter according to an embodiment of the invention.

FIG. 5a illustrates a schematic structure of a transmitter 500 as shown in FIG. 2. The transmitter 500 comprises:
  an antenna 510 configured for transmitting, via different sub-bands a first set of transmission directional beams 8, 9, 10 in different directions to a first set of reception directional beams at the receiver 400, and configured for receiving a signal intensities test result of the first set of transmission directional beams 8, 9, 10 from the receiver 400;
  a determining module 520 configured for determining a first pair of directional beams having the strongest signal intensity. The first pair of directional beams comprises a reception directional beam of the first set of reception directional beams 11, 12, 13 and a transmission directional beam of the first set of the transmission directional beams 8, 9, 10;
  the antenna 510 is further configured for transmitting an indication of the first pair of directional beams; and
  a connection establishing module 530 configured for establishing a first millimeter connection between the receiver 400 and the transmitter 500 using the first pair of directional beams;
  the antenna 510 is further configured for transmitting, via different sub-bands a second set of transmission directional beams in different directions to a second set of reception directional beams at the receiver 400. The directions of the second set of transmission directional beams are in the vicinity of the direction of the transmission directional beam of the first pair of directional beams. The antenna 510 is further configured for receiving a signal intensities test result of the second set of transmission directional beams 8, 9, 10 from the receiver 400;
  the determining module 520 is further configured for determining a second pair of directional beams having the strongest signal intensity. The signal intensity of the second pair of directional beams is stronger than the signal intensity of the first pair of directional beams. The second pair of directional beams comprises a reception directional beam of the second set of reception directional beams 11, 12, 13 and a transmission directional beam of the second set of the transmission directional beams 8, 9, 10;
  the antenna 510 is further configured for transmitting an indication of the second pair of directional beams; and
  the connection establishing module 530 is further configured for establishing a second millimeter connection between the receiver 400 and the transmitter 500 using the second pair of directional beams.

Figure 5B:
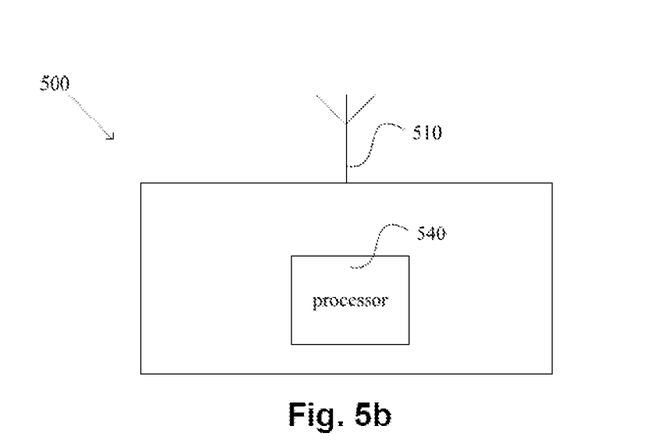
FIG. 5b illustrates a schematic structure of a transmitter according to another embodiment of the invention.

FIG. 5b illustrates another schematic structure of a transmitter 500 as shown in FIG. 2. The transmitter 500 comprises an antenna 520 as shown in FIG. 5a, and a processor 540 implementing the determining module 520 and the connection establishing module 530 shown in FIG. 5a.

According to an aspect, a system is provided. The system comprises the receiver 400 as shown in FIG. 4a or 4b; and/or a transmitter 500 as shown in FIG. 5a or 5b. In FIG. 2, as an example, the transmitter 400 is the base station or access point 6, the receiver 500 is the mobile station 14. However, the receiver 400 can be an access point or a base station when the transmitter 500 is a mobile station, also referred to as mobile terminal or mobile device.

Figure 6:
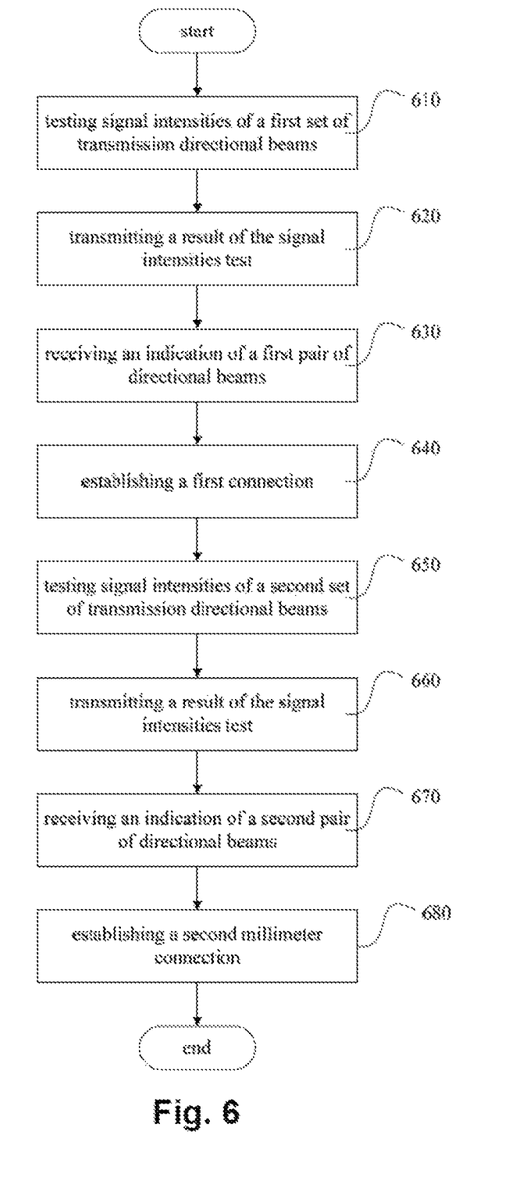
FIG. 6 shows a flow chart of establishing a millimeter connection according to an embodiment of the invention.

FIG. 6 shows a flow chart of establishing a millimeter connection according to an embodiment of the invention. The method shown in FIG. 6 illustrates a recursive process to find a pair of directional beams with stronger signal intensity, in order to track the mobile station using the found pair of directional beams. For example, the method of FIG. 6 iterates two times in the recursive process in order to find an even stronger pair of directional beams, The number of iterations is not limited, but can also be three, four, or even more. The method can be performed by the receiver 400, comprises:
  block 610: at the receiver 400 using a first set of reception directional beams 11, 12, 13 testing signal intensities of a first set of transmission directional beams 8, 9, 10 transmitted via different sub-bands by a transmitter 500 in different directions;
  block 620: transmitting a result of the signal intensities test of the first set of transmission directional beams 8, 9, 10 to the transmitter 500;
  block 630: receiving an indication of a first pair of directional beams having the strongest signal intensity, wherein the first pair of directional beams comprises a reception directional beam of the first set of reception directional beams 11, 12, 13 and a transmission directional beam of the first set of the transmission directional beams 8, 9, 10;
  block 640: establishing a first millimeter connection between the receiver 400 and the transmitter 500 using the first pair of directional beams;

block 650: at said receiver 400 using a second set of reception directional beams testing signal intensities of a second set of transmission directional beams in different directions, which are transmitted via different sub-bands by said transmitter 500, wherein the directions of the second set of transmission directional beams are in the vicinity of the direction of the transmission directional beam of the first pair of directional beams;

block 660: transmitting a result of the signal intensities test of the second set of transmission directional beams 8, 9, 10 to the transmitter 500;

block 670: receiving an indication of a second pair of directional beams having the strongest signal intensity, wherein the signal intensity of the second pair of directional beams is stronger than the signal intensity of the first pair of directional beams; wherein the second pair of directional beams comprises a reception directional beam of the second set of reception directional beams and a transmission directional beam of the second set of transmission directional beams; and block 680: establishing a second millimeter connection between the receiver 400 and the transmitter 500 using the second pair of directional beams.

Figure 7:
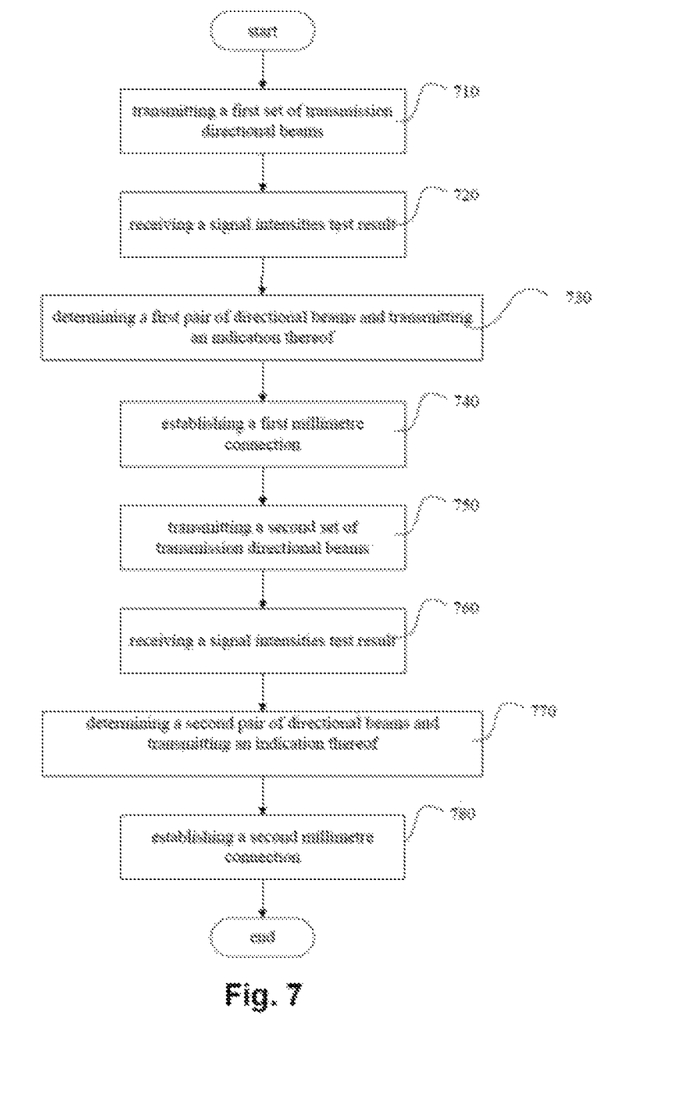
FIG. 7 shows a flow chart of establishing a millimeter connection according to another embodiment of the invention.

FIG. 7 shows a flow chart of establishing a millimeter connection according to an embodiment of the invention. The method shown in FIG. 7 illustrates a recursive process to find a pair of directional beams with stronger signal intensity, in order to track the mobile station using the found pair of directional beams. For example, the method of FIG. 7 iterates two times in the recursive process as an example, in order to find an even stronger pair of directional beams. The number iterations is not limited, but can also be three, four, or even more. The method can be performed by the transmitter 500, comprises block 710: transmitting, via different sub-bands a first set of transmission directional beams 8, 9, 10 in different directions, to a first set of reception directional beams at the receiver 400;

block 720: receiving a signal intensities test result of the first set of transmission directional beams 8, 9, 10 from the receiver 400;

block 730: determining a first pair of directional beams having the strongest signal intensity, wherein the first pair of directional beams comprises a reception directional beam of the first set of reception directional beams 11, 12, 13 and a transmission directional beam of the first set of the transmission directional beams 8, 9, 10;

block 730: transmitting an indication of the first pair of directional beams;

block 740: establishing a first millimeter connection between the receiver 400 and the transmitter 500 using the first pair of directional beams;

block 750: transmitting, via different sub-bands a second set of transmission directional beams in different directions, to a second set of reception directional beams at a receiver 400, wherein the directions of the second set of transmission directional beams are in the vicinity of the direction of the transmission directional beam of the first pair of directional beams;

block 760: receiving a signal intensities test result of the second set of transmission directional beams 8, 9, 10 from the receiver 400;

block 770: determining a second pair of directional beams having the strongest signal intensity, wherein the signal intensity of the second pair of directional beams is stronger than the signal intensity of the first pair of directional beams; wherein the second pair of directional beams comprises a reception directional beam of the second set of reception directional beams 11, 12, 13 and a transmission directional beam of the second set of the transmission directional beams 8, 9, 10;

block 770: transmitting an indication of the second pair of directional beams; and block 780: establishing a second millimeter connection between the receiver 400 and the transmitter 500 using the second pair of directional beams.

In the present specification, the term "comprising" as used in the claims does not exclude other elements or steps. The term "a" or "an" as used in the claims does not exclude a plurality.

The reference signs used in the claims shall not be construed as limiting the scope.

Although the present invention has been described in detail for purpose of illustration, it is understood that such detail is solely for that purpose, and variations can be made therein by those skilled in the art without departing from the scope of the invention.

The invention claimed is:

1. A first transceiver for establishing a wireless millimeter connection between said first transceiver and a second transceiver, comprising:
   an antenna;
   a memory; and
   a processor coupled to the memory to execute computer instructions stored in the memory to cause the first transceiver to perform the steps of:
      receiving and using a first set of reception directional beams for testing signal intensities of a first set of transmission directional beams transmitted by the second transceiver in different directions via different sub-bands to differentiate the transmission directional beams in the first set to generate a result;
      transmitting the result of the signal intensities test to the second transceiver;
      receiving an indication of a first pair of directional beams having a first strongest signal intensity, wherein the first pair of directional beams comprises a reception directional beam of the first set of reception directional beams and a transmission directional beam of the first set of the transmission directional beams; and
      establishing a first connection between the first transceiver and the second transceiver using the first pair of directional beams;
      receiving and using a second set of reception directional beams for testing signal intensities of a second set of transmission directional beams transmitted by the second transceiver in different directions via the different sub-bands to differentiate the transmission directional beams in the second set, wherein the different directions of the second set of transmission directional beams are in the vicinity of the direction of the transmission directional beam of the first pair of directional beams;
      transmitting a result of the signal intensities test of the second set of transmission directional beams to the second transceiver and receiving an indication of a second pair of directional beams having a second strongest signal intensity, wherein the signal intensity of the second pair of directional beams is stronger than the signal intensity of the first pair of directional beams wherein the second pair of directional beams comprises a reception directional beam of the second set of reception directional beams and a transmission directional beam of the second set of transmission directional beams; and establishing a second connection between the first transceiver and the second transceiver using the second pair of directional beams; and wherein the first transceiver is a mobile terminal and wherein the number of the transmission directional beams in the second set of transmission directional beams is associated to motion characteristics of the mobile terminal such that when the mobile terminal moves in higher speed, the number of transmission directional beams in the second set of transmission directional beams is higher than the number of transmission directional beams in the first set of transmission directional beams.

2. The first transceiver according to claim 1, wherein the first set of transmission directional beams are wider in beamwidth than the second set of transmission directional beams.

3. The first transceiver according to claim 1, wherein the first set of reception directional beams are wider in beamwidth than the second set of reception directional beams.

4. The first transceiver according to claim 1, wherein the frequency of the first set of transmission directional beams is lower than the frequency of the second set of transmission directional beams.

5. The first transceiver according to claim 1, wherein the frequency of the first set of reception directional beams is lower than the frequency of the second set of reception directional beams.

6. The first transceiver according to claim 1, wherein the number of the reception directional beams of the second set of reception directional beams is associated to motion characteristics of the mobile terminal.

7. The first transceiver according to claim 1, wherein the first set of reception directional beams are wider in beamwidth than the first set of transmission directional beams.

8. The first transceiver according to claim 1, wherein the second set of reception directional beams are wider in beamwidth than the second set of transmission directional beams.

9. The first transceiver according to claim 1, wherein the first/second set of reception directional beams are omnidirectional beams.

10. A second transceiver for establishing a wireless millimeter connection between a first transceiver and said second transceiver and, comprising:
an antenna;
a memory;
a processor coupled to the memory to execute computer instructions stored in the memory to cause the second transceiver to perform the steps of;
transmitting, a first set of transmission directional beams in different directions via different sub-bands to differentiate the transmission directional beams in the first set to a first set of reception directional beams at the first transceiver, and receiving a signal intensities test result of the first set of transmission directional beams from the first transceiver;
determining a first pair of directional beams having a first strongest signal intensity, wherein the first pair of directional beams comprises a reception directional beam of the first set of reception directional beams and a transmission directional beam of the first set of the transmission directional beams;
transmitting an indication of the first pair of directional beams; and establishing a first connection between the first transceiver and the second transceiver using the first pair of directional beams;
transmitting, a second set of transmission directional beams in different directions via the different sub-bands to differentiate the transmission directional beams in the second set to a second set of reception directional beams at the first transceiver, wherein the directions of the second set of transmission directional beams are in the vicinity of the direction of the transmission directional beam of the first pair of directional beams; and receiving a signal intensities test result of the second set of transmission directional beams from the first transceiver;
the processor is further configured for determining a second pair of directional beams having a second strongest signal intensity, wherein the signal intensity of the second pair of directional beams is stronger than the signal intensity of the first pair of directional beams; wherein the second pair of directional beams comprises a reception directional beam of the second set of reception directional beams and a transmission directional beam of the second set of the transmission directional beams;
transmitting an indication of the second pair of directional beams; and
establishing a second connection between the first transceiver and the second transceiver using the second pair of directional beams; and
wherein the first transceiver is a mobile terminal and wherein the number of the transmission directional beams in the second set of transmission directional beams is associated to motion characteristics of the mobile terminal such that when the mobile terminal moves in higher speed, the number of transmission directional beams in the second set of transmission directional beams is higher than the number of transmission directional beams in the first set of transmission directional beams.

11. A system for establishing a wireless millimeter connection comprising a first transceiver and a second transceiver;
wherein the second transceiver is configured for:
transmitting, a first set of transmission directional beams in different directions via different sub-bands to differentiate the transmission directional beams in the first set to a first set of reception directional beams at the first transceiver;
receiving a signal intensities test result of the first set of transmission directional beams from the first transceiver;
determining a first pair of directional beams having a first strongest signal intensity, wherein the first pair of directional beams comprises a reception directional beam of the first set of reception directional beams and a transmission directional beam of the first set of the transmission directional beams;
transmitting an indication of the first pair of directional beams; and
establishing a first connection between the second transceiver and the first transceiver using the first pair of directional beams;
the first transceiver is configured for:
receiving and using the first set of reception directional beams for testing signal intensities of the first set of transmission directional beams in different directions;

transmitting the signal intensities test result of the first set of transmission directional beams to the second transceiver;
receiving the indication of the first pair of directional beams having the first strongest signal intensity; and
establishing the first connection between the first transceiver and the second transceiver using the first pair of directional beams;
and wherein the second transceiver is further configured for:
transmitting, a second set of transmission directional beams in different directions via the different sub-bands to differentiate the transmission directional beams in the second set to a second set of reception directional beams at the first transceiver, wherein the directions of the second set of transmission directional beams are in the vicinity of the direction of the transmission directional beam of the first pair of directional beams;
receiving a signal intensities test result of the second set of transmission directional beams from the first transceiver;
determining a second pair of directional beams having a second strongest signal intensity, wherein the signal intensity of the second pair of directional beams is stronger than the signal intensity of the first pair of directional beams; wherein the second pair of directional beams comprises a reception directional beam of the second set of reception directional beams and a transmission directional beam of the second set of the transmission directional beams;
transmitting an indication of the second pair of directional beams; and
establishing a second connection between the second transceiver and the first transceiver using the second pair of directional beams;
the first transceiver is further configured for:
receiving and using the second set of reception directional beams testing for signal intensities of the second set of transmission directional beams in different directions;
transmitting the signal intensities test result of the second set of transmission directional beams to the second transceiver;
receiving the indication of the second pair of directional beams having the second strongest signal intensity; and
establishing the second connection between the first transceiver and the second transceiver using the second pair of directional beams; and
wherein the first transceiver is a mobile terminal and wherein the number of the transmission directional beams in the second set of transmission directional beams is associated to motion characteristics of the mobile terminal such that when the mobile terminal moves in higher speed, the number of transmission directional beams in the second set of transmission directional beams is higher than the number of transmission directional beams in the first set of transmission directional beams.

12. A method for establishing a wireless millimeter connection between a first transceiver and a second transceiver, the method comprising the steps of:
at the first transceiver receiving and using a first set of reception directional beams for testing signal intensities of a first set of transmission directional beams transmitted by the second transceiver in different directions via different sub-bands to differentiate the transmission directional beams in the first set to generate a result;
transmitting the result of the signal intensities test to the second transceiver;
receiving an indication of a first pair of directional beams having a first strongest signal intensity, wherein the first pair of directional beams comprises a reception directional beam of the first set of reception directional beams and a transmission directional beam of the first set of transmission directional beams;
establishing a first connection between the first transceiver and the second transceiver using the first pair of directional beams;
at said first transceiver receiving and using a second set of reception directional beams for testing signal intensities of a second set of transmission directional beams in different directions transmitted by the second transceiver in different directions via the different sub-bands to differentiate the transmission directional beams in the second set, wherein the directions of the second set of transmission directional beams are in the vicinity of the direction of the transmission directional beam of the first pair of directional beams;
transmitting a result of the signal intensities test of the second set of transmission directional beams to the second transceiver;
receiving an indication of a second pair of directional beams having a second strongest signal intensity, wherein the signal intensity of the second pair of directional beams is stronger than the signal intensity of the first pair of directional beams; wherein the second pair of directional beams comprises a reception directional beam of the second set of reception directional beams and a transmission directional beam of the second set of transmission directional beams; and
establishing a second connection between the first transceiver and the second transceiver using the second pair of directional beams; and
wherein the first transceiver is a mobile terminal and wherein the number of the transmission directional beams in the second set of transmission directional beams is associated to motion characteristics of the mobile terminal such that when the mobile terminal moves in higher speed, the number of transmission directional beams in the second set of transmission directional beams is higher than the number of transmission directional beams in the first set of transmission directional beams.

13. A method for establishing a wireless millimeter connection between a first transceiver and a second transceiver, the method comprising:
transmitting, a first set of transmission directional beams in different directions via different sub-bands to differentiate the transmission directional beams in the first set, to a first set of reception directional beams at the first transceiver;
receiving a signal intensities test result of the first set of transmission directional beams from the first transceiver;
determining a first pair of directional beams having a first strongest signal intensity, wherein the first pair of directional beams comprises a reception directional beam of the first set of reception directional beams and a transmission directional beam of the first set of the transmission directional beams;

transmitting an indication of the first pair of directional beams;

establishing a first connection between the first transceiver and the second transceiver using the first pair of directional beams;

transmitting, a second set of transmission directional beams in different directions via the different sub-bands to differentiate the transmission directional beams in the second set, to a second set of reception directional beams at the first transceiver, wherein the directions of the second set of transmission directional beams are in the vicinity of the direction of the transmission directional beam of the first pair of directional beams;

receiving a signal intensities test result of the second set of transmission directional beams from the first transceiver;

determining a second pair of directional beams having a second strongest signal intensity, wherein the second signal intensity of the second pair of directional beams is stronger than the first signal intensity of the first pair of directional beams; wherein the second pair of directional beams comprises a reception directional beam of the second set of reception directional beams and a transmission directional beam of the second set of the transmission directional beams;

transmitting an indication of the second pair of directional beams; and establishing a second connection between the first transceiver and the second transceiver using the second pair of directional beams; and wherein the first transceiver is a mobile terminal and wherein the number of the transmission directional beams in the second set of transmission directional beams is associated to motion characteristics of the mobile terminal such that when the mobile terminal moves in higher speed, the number of transmission directional beams in the second set of transmission directional beams is higher than the number of transmission directional beams in the first set of transmission directional beams.

14. The first transceiver according claim 1, covering all sub-bands used for transmitting the first and second sets of transmission directional beams.

* * * * *